Patented Nov. 2, 1926.

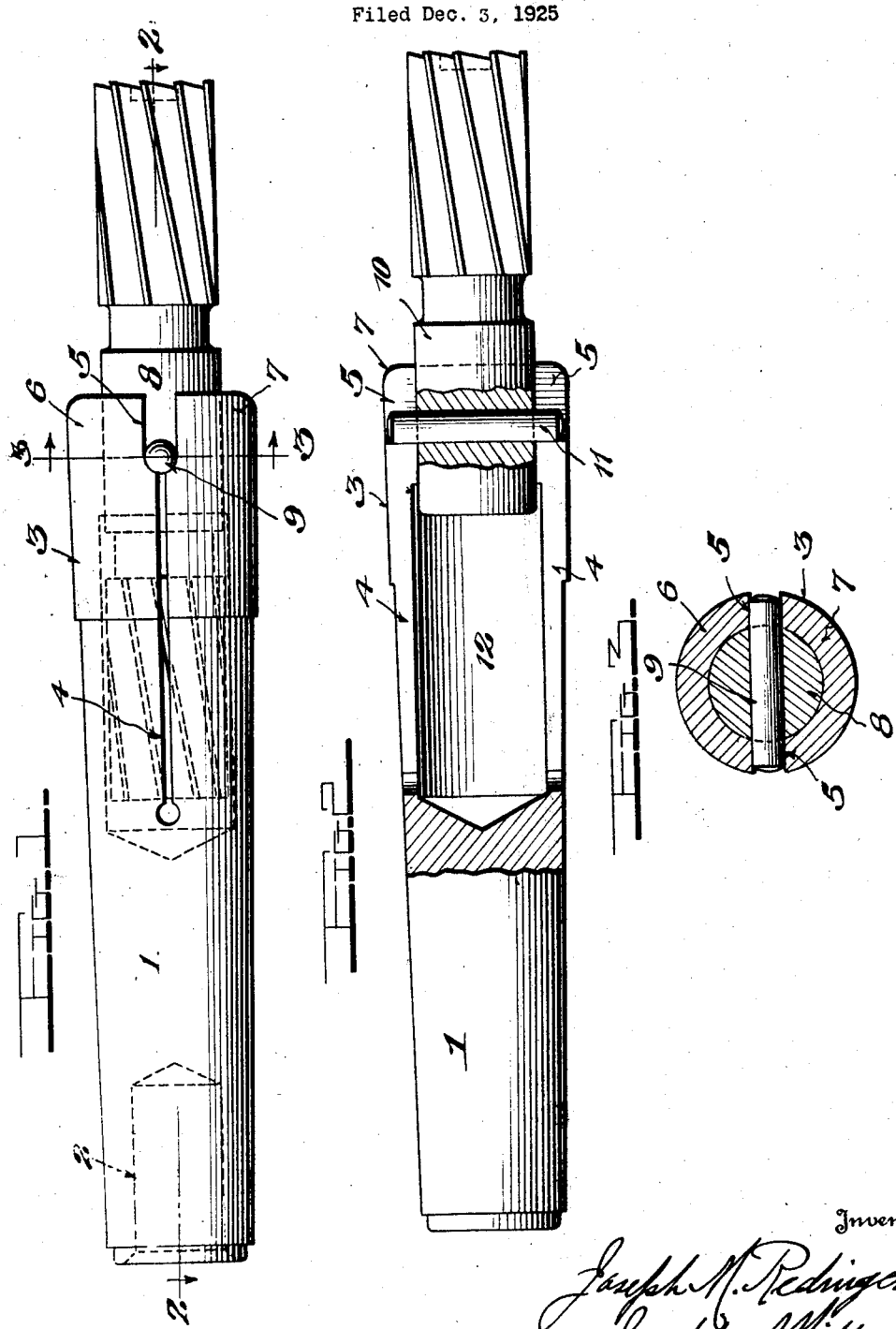

1,605,142

UNITED STATES PATENT OFFICE.

JOSEPH M. REDINGER, OF PROVIDENCE, RHODE ISLAND.

MILLING-CUTTER HOLDER.

Application filed December 3, 1925. Serial No. 72,944.

This invention relates to certain new and useful improvements in milling cutter holders and the primary object thereof is to provide an economical and effective holder which is equally applicable to either single or double milling cutters.

A further object of the invention is to provide a novel means for not only clampingly engaging the tool or cutter but to also hold same against rotation.

A still further object of the invention is to provide a holder which clutches the cutter without the employment of any movable parts.

In the drawings:—

Figure 1 is a side elevation of the invention applied to a double cutter;

Figure 2 is a similar view partly in section on line 2—2 of Fig. 1 of the invention applied to a single cutter; and Figure 3 is a section on line 3—3 of Figure 1.

In proceeding in accordance with the present invention a holder 1 of spring metal is employed having a socket 2 at one end for securement to the head of a lathe or the like and a socket 12 at its opposite end. The body which is of tapering formation has an enlarged head 3 at its outer end. Axial slots 4 are formed in the body and on diametrically opposite sides thereof. These slots 4 extend for a distance along the length of the body and through the free end of the head 3 and further having enlarged portions 5 at the outer ends of the slots. It will be thus seen that the holder is resilient at its outer end, so that the resultant jaws 6 and 7 may be moved relatively toward and away from each other.

The invention is adapted for use with either a a single or a double milling cutter. In Figure 1 of the drawing a double cutter is illustrated which has a central shank 8 through which a pin 9 is projected. In Figure 2 of the drawing a single form of cutter is shown having a shank 10 equipped with a pin 11 similar to the pin 9. The pins in each instance have their ends projecting outwardly from diametrically opposite sides of the shanks, and are of a size so that their ends will be received in the enlarged ends 5 of the slots 4.

From the foregoing it will be seen that the cutters can be easily moved into and out of the axial socket 12 of the body, and that when the latter is engaged in the usual conical socket in the lathe head, the jaws 6 and 7 will be compressed to tightly grip the cutter. Due to the pin engaging in the enlarged ends 5 of the slots, the cutter will be held against turning movement relative to the holder. Upon movement of the holder out of the lathe head the jaws 6 and 7 will spring apart and thereby enable the cutter to be easily removed.

Having thus described my invention what I claim as new and desire to secure by Letters Patent is:—

1. In a milling cutter holder, a tapered body having a socket at one end and formed with axial slots on diametrically opposite sides thereof, the outer ends of the slots being enlarged and extending through the outer end of the body, a cutter, and a pin extending diametrically through the shank of the cutter, the cutter shank being received in the socket and the pin ends being received in the said enlarged ends of the slots.

2. A cutter holder for lathes composed of a body having a slot and having opposed resilient jaws formed to be received in the head of a lathe, a cutter received between the jaws, and a projection on the cutter engaged in the slot the projection terminating in spaced relation to the periphery of the jaws whereby to permit the latter to be compressed when the holder is inserted in the head of a lathe, without engagement of the projection with the lathe head.

In testimony whereof I have signed my name to this specification.

JOSEPH M. REDINGER.